(12) United States Patent
Wolf

(10) Patent No.: US 10,864,951 B2
(45) Date of Patent: Dec. 15, 2020

(54) AIR-DIRECTING DEVICE FOR A MOTOR-VEHICLE BODY, AND MOTOR-VEHICLE BODY

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 27 days.

(21) Appl. No.: 16/244,231

(22) Filed: Jan. 10, 2019

(65) Prior Publication Data
US 2019/0210666 A1 Jul. 11, 2019

(30) Foreign Application Priority Data
Jan. 11, 2018 (DE) .......................... 10 2018 100 522

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .... B62D 35/00; B62D 35/007; B62D 35/001; B62D 35/02; B62D 37/02; B62D 35/005; B62D 35/008; B62D 25/16
USPC .......... 296/180.1, 180.4, 187.09, 100.03, 76, 296/39.2, 37.7; 29/408, 428, 446, 894.3; 137/13, 803, 808
See application file for complete search history.

(56) References Cited

U.S. PATENT DOCUMENTS

| 5,836,643 A * | 11/1998 | Preiss ........................ B60J 7/22 296/217 |
| 6,227,613 B1 | 5/2001 | Maciejewski et al. |
| 6,378,932 B1 * | 4/2002 | Fasel .................... B62D 35/001 296/180.5 |
| 6,447,050 B1 * | 9/2002 | Plassmeyer ................ B60J 7/22 296/180.5 |
| 8,210,600 B1 * | 7/2012 | Verhee .................. B62D 35/005 296/180.1 |
| 9,567,015 B2 * | 2/2017 | Wolf ....................... B62D 37/02 |

(Continued)

FOREIGN PATENT DOCUMENTS

| DE | 2726507 A1 | 12/1978 |
| EP | 0969981 B1 | 5/2002 |
| EP | 1630080 B1 | 2/2008 |

*Primary Examiner* — D Glenn Dayoan
*Assistant Examiner* — Sunsurraye Westbrook
(74) *Attorney, Agent, or Firm* — Leydig, Voit & Mayer, Ltd.

(57) ABSTRACT

An air-directing device for a motor-vehicle body includes an air-directing element having a longitudinal axis and being accommodated in a guide element of the air-directing device. The air directing device additionally includes a flow channel formed in between the guide element and the air-directing element, wherein flow can take place through the flow channel starting from an entry opening, which faces toward a front of the motor-vehicle body, and extending through an exit opening, which faces away from the entry opening. The air-directing device is designed so that the air flowing through the flow channel is guided thereby such that it can flow out of the exit opening transversely to an outer contour of the air-directing element.

18 Claims, 5 Drawing Sheets

(56) References Cited

U.S. PATENT DOCUMENTS

2006/0043770 A1   3/2006  Preiss
2015/0274233 A1*  10/2015 Hamada ................... B62J 9/25
                                                     224/413

* cited by examiner

AIR-DIRECTING DEVICE FOR A MOTOR-VEHICLE BODY, AND MOTOR-VEHICLE BODY

CROSS REFERENCE TO RELATED APPLICATIONS

This application claims benefit to German Patent Application No. DE 10 2018 100 522.9, filed Jan. 11, 2018, which is hereby incorporated by reference herein.

FIELD

The invention relates to an air-directing device for a motor-vehicle body, and to a motor-vehicle body having an air-directing device.

BACKGROUND

Air-directing devices for motor-vehicle bodies are known. They serve to guide an air stream forming along the motor-vehicle body, and can be used to create enhanced lift and to reduce drag. The air-directing devices of this kind are usually also referred to as spoilers.

Laid-open application DE 27 26 507 A1 discloses an air-directing device which is intended for a motor-vehicle body and has a throughflow channel. The throughflow channel serves to guide air which is generated with the aid of an air-flow generator, such as for example a compressor of a turbocharger, is guided if required through the throughflow channel and is intended to influence lift of the motor vehicle.

EP 0 969 981 B1 discloses an air-directing device for influencing the noise created by an open sunroof of a motor-vehicle body. The air-directing device is arranged to face toward a front of the motor-vehicle body, in front of the sunroof. With the aid of the air-directing device, the air flowing along the motor-vehicle body is deflected upward, and thus away from the motor-vehicle body, at least to some extent in front of the sunroof. Some of the air is deflected into a flow gap, which is formed between the air-directing device and the motor-vehicle body and is guided more or less vertically upward relative to the motor-vehicle body, in front of the sunroof. Fitting the air-directing device on the motor-vehicle body in front of the sunroof, however, means that said device, at best, has no influence on the lift and the drag of the motor vehicle.

EP 1 630 080 B1 discloses an air-directing device for influencing the downforce and the drag, it being possible for flow to take place beneath the air-guide element of said air-directing device. It is not just the case here that the air flows along a directing surface facing away from the motor-vehicle body; rather, it is guided through a gap formed between the motor-vehicle body and the air-guide element. The air-directing device is arranged in a rear-end region of the motor-vehicle body.

SUMMARY

In an embodiment, the present invention provides an air-directing device for a motor-vehicle body, wherein the air-directing device is configured to be provided in a rear-end region of the motor-vehicle body. The air-directing device includes an air-directing element having a longitudinal axis and being accommodated in a guide element of the air-directing device. A flow channel formed between the guide element and the air-directing element, wherein flow can take place through the flow channel starting from an entry opening, which faces toward a front of the motor-vehicle body, and extending through an exit opening, which faces away from the entry opening. The air-directing device is configured so that the air flowing through the flow channel is guided thereby such that it can flow out of the exit opening transversely to an outer contour of the air-directing element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
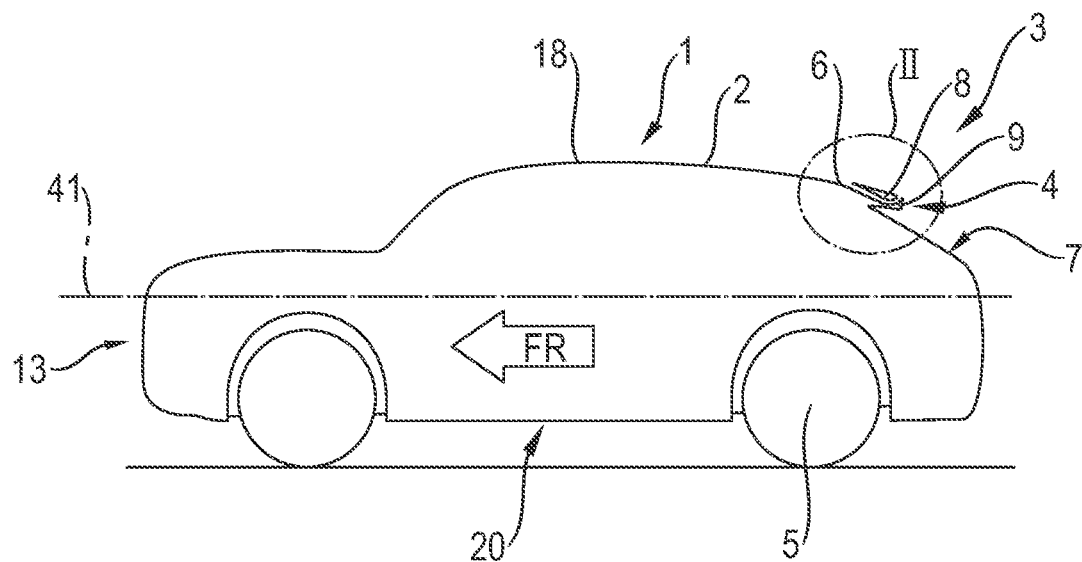
FIG. 1 shows a schematic illustration of a motor-vehicle body having a first exemplary embodiment of an air-directing device according to an embodiment of the invention.

Embodiments of the present invention provide improved air-directing devices which are intended for a motor-vehicle body and with the aid of which there is a further increase in downforce without any increase in a drag coefficient. Embodiments of the invention also provide motor-vehicle bodies having improved driving dynamics.

An air-directing device according to the invention for a motor-vehicle body is provided in a rear-end region of the motor-vehicle body. It has an air-directing element, which has a longitudinal axis and is accommodated in a guide element of the air-directing device, a flow channel being formed in the process between the guide element and the air-directing element. Flow can take place through the flow channel starting from an entry opening, which faces toward a front of the motor-vehicle body, via an exit opening, which faces away from the entry opening. According to the invention, the air-directing device is designed so that the air flowing through the flow channel is guided thereby such that it can flow out of the exit opening essentially transversally, in particular perpendicularly, to an outer contour of the air-directing element. This means, in other words, that the air flowing through the flow channel is guided upward, and thus away from the vehicle body, at the exit opening, in particular perpendicularly to the outer contour. The advantage of the directing device according to the invention can be considered that of the air which flows via the exit opening more or less perpendicularly to the outer contour, in particular to the upper surface of the air-directing element, having the effect of a conventional spoiler, which is set in position to reduce the lift and increase the downforce. This means that the air-directing element need not necessarily be adjustable in order for the lift acting, in particular, on a rear axle of the motor vehicle to be reduced. In addition, stabilization is achieved in respect of rear-end outflow and thus of the driving dynamics of the motor vehicle.

In particular it is possible, when an upper surface of the air-directing element is positioned at least in alignment with a virtual extension of a roofline, and/or beneath the virtual extension of the roofline, of the motor-vehicle body, for the drag of the motor-vehicle body to be reduced in addition.

In one configuration, a first separation edge of the guide element has, along its virtual extension, a projecting portion in relation to a second separation edge of the air-directing element. This configuration assists in stalling flow.

The flow channel can have a constant flow cross section. It is likewise possible, starting from the entry opening, for it to taper at least to some extent in the direction of the exit opening. The tapering of the flow cross section leads to an increase in the speed of the air stream in the flow channel, as a result of which the downforce can be increased in addition.

In a further configuration, the air-directing element is designed in the form of a shaped element. This means, in other words, that in particular the entry edge and/or the separation edge of the air-directing element are not designed in the form of a rectilinear edge; rather, these edges cover variable progression in particular along the longitudinal extent and along the width extent of the air-directing element. Visual effects, but in particular aerodynamic effects, can be involved here, wherein the shape of the entry and separation edges can influence the inflow and outflow.

If the air-directing element is designed symmetrically in relation to its longitudinal axis, in particular if the air-directing element is designed in the form of a shaped element, improved stability of the driving dynamics can be achieved.

The air-directing device preferably has at least one chamber, wherein flow can take place through the chamber in the direction of the longitudinal axis of the air-directing element. This makes it possible to achieve improved downforce, i.e. higher downforce than if, for example, the air-directing device were fastened at its center point on the guide element with the aid of a retaining element, in which case free flow through the flow channel would take place at least along outer edges of the air-directing element. If there are a plurality of chambers, the desired downforce can be achieved in a more differentiated manner. The plurality of chambers can achieve uniform throughflow through, and outflow from, the flow channel.

In order for the air-directing element to be fastened securely on the guide element, it is connected to the guide element with the aid of elements which extend in particular in the direction of its longitudinal axis. These elements can preferably be the already present outer edges of the directing element, but it is likewise also possible for additional supports, with which the chambers can be formed, to serve for fastening purposes.

A second aspect of the invention relates to a motor-vehicle body having an air-directing device for influencing downforce and a drag coefficient, wherein the air-directing device is designed so that the air flowing through a flow channel is guided thereby such that it can flow out of an exit opening essentially transversely, in particular perpendicularly, to an outer contour of the air-directing element. This motor-vehicle body has, in particular, low drag coefficients, a reduction in lift and stable driving dynamics, as a result of which it is possible to reduce fuel consumption of a motor vehicle equipped with the motor-vehicle body according to the invention.

A motor vehicle 1 designed in accordance with FIG. 1 has a body 2 according to the invention, which has an air-directing device 4 according to the invention arranged in a rear-end region 3 of the motor-vehicle body 2.

The air-directing device 4 is provided in order to reduce lift along a rear axle 5 of the motor vehicle 1 and is arranged in the region of a rear edge 6 of the roof at the rear-end region 3, above a rear window 7 of the rear-end region 3.

The air-directing device 4 comprises an air-directing element 8 and a guide element 9, wherein the guide element 9 is of shell-like design and accommodates the air-directing element 8. The guide element 9 is connected in a releasable manner to the motor-vehicle body 2 and extends essentially along a width of the motor-vehicle body 2, that is to say transversely to a longitudinal axis 41 of the vehicle. Relative to its extent along the width of the motor-vehicle body 2, the guide element 9 has a small extent in the direction of the longitudinal axis 41 of the vehicle.

A flow channel 10, through which flow can take place and which has an entry opening 11 and an exit opening 12, is formed between the air-directing element 8 and the guide element 9, wherein flow can take place through the flow channel 10 along the longitudinal extent of the motor vehicle 1. The entry opening 11 faces toward a front 13 of the vehicle, and the exit opening 12 faces away from the entry opening 11.

A flow ramp 15 is formed upstream of the flow channel 10, that is to say, in other words, in front of the air-directing element 8, as seen from the front 13 of the vehicle in the direction of the rear window 7. In this exemplary embodiment, said flow ramp 15 is formed on the guide element 9. The flow ramp 15 is in alignment with a so-called roofline 16 as far as a ramp edge 17. Downstream of the ramp edge 17, the flow ramp 15 is located beneath the roofline 16, wherein, as seen in cross section, see FIG. 2, it extends concavely as far as the entry opening 11. It would also be possible for the flow ramp 15 to be of rectilinear design and/or to be formed likewise on a roof 18 of the motor-vehicle body 2.

Figure 3:
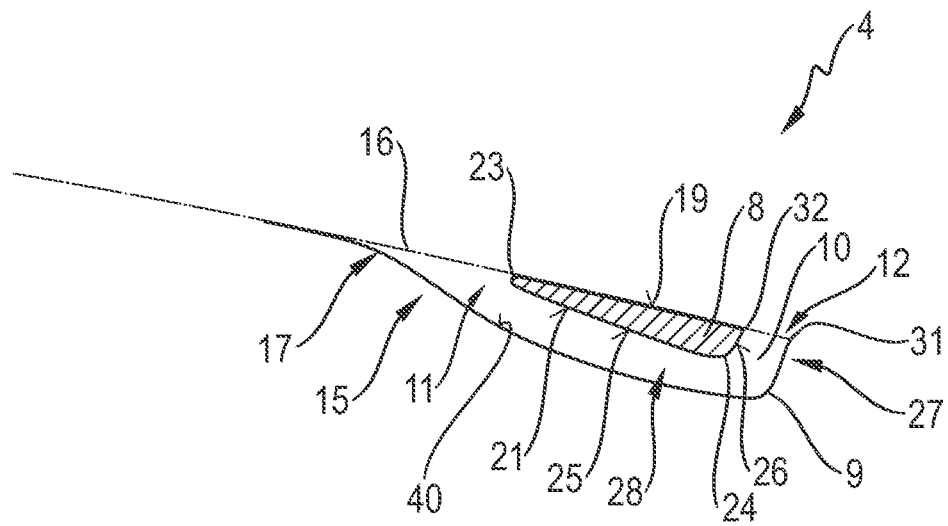
FIG. 3 shows a longitudinal section through an air-directing device according to a second embodiment of the invention.

The air-directing element 8 having a first width B1 is arranged such that its upper surface 19, which faces toward the surroundings, is approximately parallel to a virtual extension of the roofline 16, wherein the virtual extension of the roofline 16 is located at a lower level, in the direction of a floor 20 of the vehicle, than the upper surface 19. In a second exemplary embodiment, as is illustrated in FIG. 3, the upper surface 19 is positioned beneath the virtual extension of the roofline 16. This corresponds to the air-directing element 8 being positioned in a manner which yet further reduces the drag of the motor-vehicle body 2.

In the exemplary embodiments illustrated, as are illustrated in FIGS. 1 to 11, the air-directing element 8 is connected rigidly to the guide element 9. It would likewise be possible for the air-directing element 8 also to be connected to the guide element 9 such that it can be moved in part or in full, this making it possible to achieve further adaptation of the lift or downforce.

The upper surface 19 of the air-directing element 8 is essentially of planar design. The air-directing element 8 has a more or less triangular cross section corresponding to a wing, wherein the upper surface 19 and a lower surface 21, facing away from the upper surface 19, of the air-directing element 8, have a joint entry edge 23 at the entry opening 11. On that side of the air-directing element 8 which faces away from the entry edge 23, the upper surface 19 is connected to the lower surface 21 with the aid of a side surface 26 of the air-directing element 8.

The flow channel 10, which is formed between the air-directing element 8 and the guide element 9, is L-shaped, with the aid of the side surface 26, along the longitudinal axis 14, in the flow direction of the flow arrow 22, and is designed so that the air flowing through the flow channel 10 flows out essentially perpendicularly to the upper surface 19, wherein the upper surface 19 is part of an outer contour 25 of the air-directing element 8. This means, in other words, that the air-directing device 4 is designed so that the air flowing through the flow channel 10 is guided thereby out of the exit opening 12 essentially perpendicularly to an outer contour 25 of the air-directing element 8.

In order to avoid stalls in flow and burbling during deflection of the air which enters into the flow channel 10 and is deflected into the flow channel 10, the entry edge 23 and also a deflecting edge 24 of the air-directing element 8, said deflecting edge being formed between the lower surface 21 and the side surface 26, are rounded.

Starting from the entry opening 11, the flow channel 10 tapers in the longitudinal direction in the direction of the exit opening 12 as far as deflecting edge 24 and, for example in dependence on the type of engine in the motor vehicle 1, it can have a greater or smaller, or variable, flow cross section in its channel-outflow portion 27, which is formed between the deflecting edge 24 and the exit opening 12.

Starting from the roof 18, the channel-inflow portion 28 of the flow channel 10 is inclined in the direction of the rear window 7 in relation to the floor 20 of the vehicle, wherein, starting from the deflecting edge 24, the channel-outflow portion 27 extends away from the floor 20 of the vehicle in the direction of the exit opening 12, so that the air can be directed out of the flow channel 10 at an angle, as seen in relation to a virtual horizontal parallel to the floor 20 of the vehicle, and in relation to an associated virtual vertical, which is acute in relation to said virtual vertical.

Figure 2:
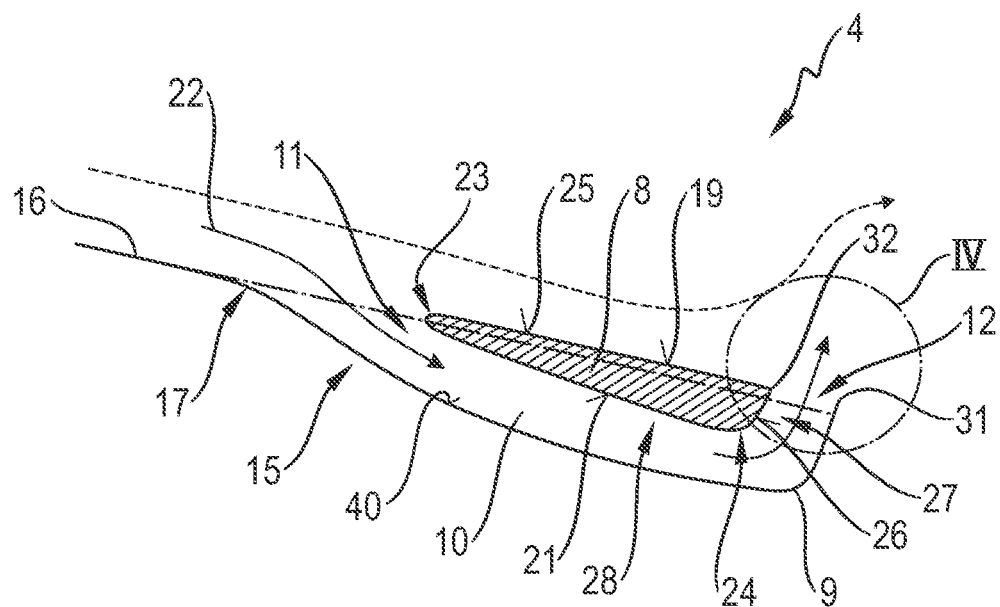
FIG. 2 shows, in detail view II, a longitudinal section through the air-directing device according to FIG. 1.
Figure 4:
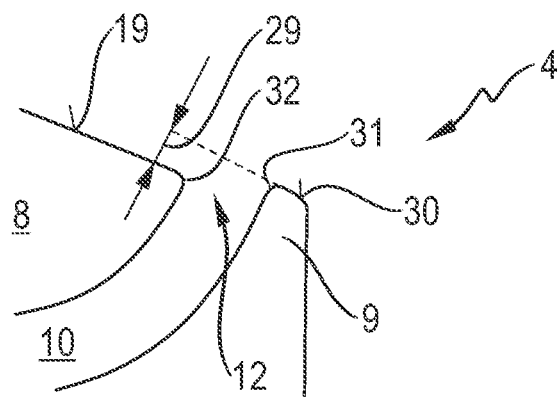
FIG. 4 shows a detail-specific longitudinal section through an air-directing device according to a third embodiment of the invention.
Figure 5:
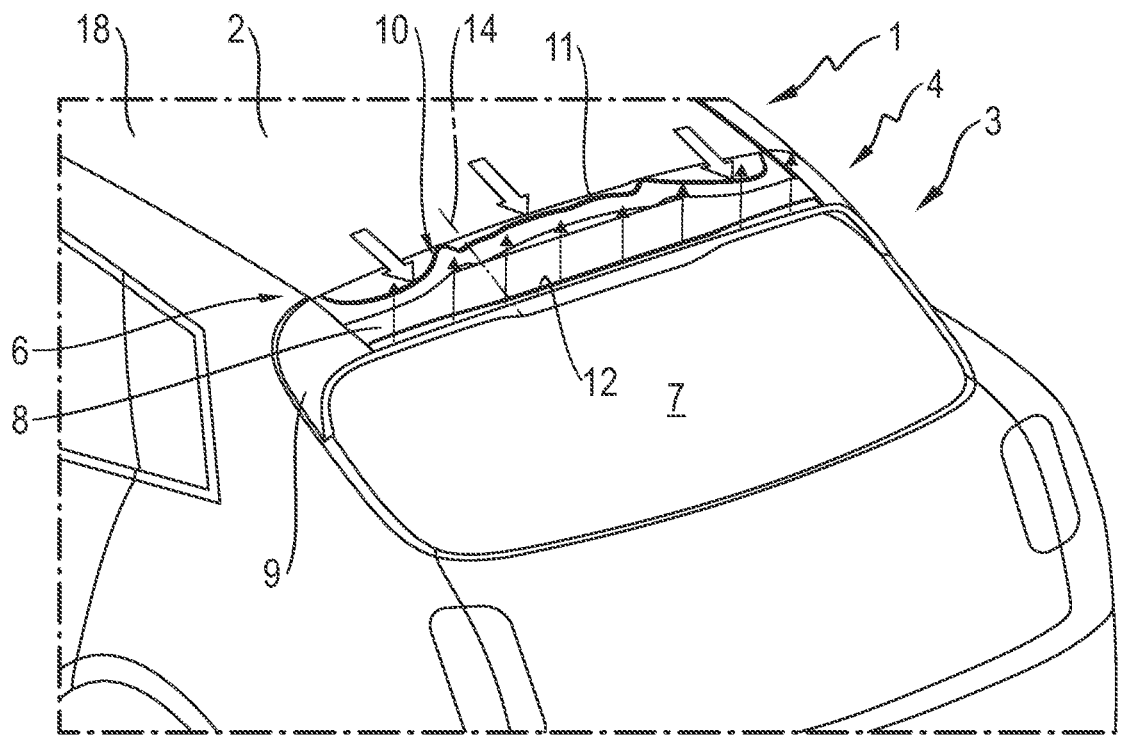
FIG. 5 shows a perspective illustration of a detail of the motor-vehicle body having the air-directing device according to FIG. 3.

FIG. 4 illustrates a detail of a longitudinal section through a third exemplary embodiment of the air-directing device 4, wherein the detail corresponds to that region of the air-directing device 4 which is indicated by IV in FIG. 2. For improved guidance of the air stream, the guide element 9 has a projecting portion 29 in relation to the upper surface 19 of the air-directing element 8. This means, in other words, that the projecting portion 29 is formed between a virtual extension of an outer surface 30 of the guide element 9, said outer surface delimiting the exit opening 12 and being inclined downward preferably away from the air-directing element, and the upper surface 19, wherein the upper surface 19 is arranged between the projecting portion 29 and the channel-inflow portion 28. This means, in other words, that the outer surface 30 has at least its first separation edge 31 at the exit opening 12, said separation edge delimiting the flow channel 10, at a higher level than a second separation edge 32 of the air-directing element 8, said second separation edge delimiting the exit opening 12.

The guide element 9 has a second width B2, which is greater than the first width B1, wherein the exit opening 12 extends essentially over the second width B2. In order to create the flow ramp 15 upstream of the entry opening 11, a first length L1 of the air-directing element 8 is rendered smaller than a second length L2 of the guide element 9.

In the first and second exemplary embodiments, the air-directing element 8 has an essentially rectilinear entry edge 23, wherein the second separation edge 32 of the air-directing element 8 is likewise of essentially rectilinear design.

Figure 6:
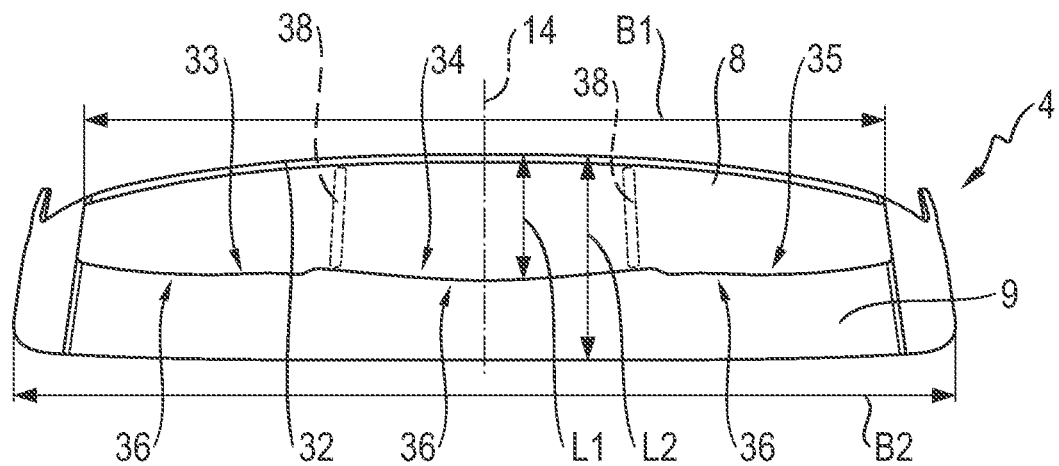
FIG. 6 shows a perspective view from the front of an air-directing device according to a fourth embodiment of the invention.
Figure 7:
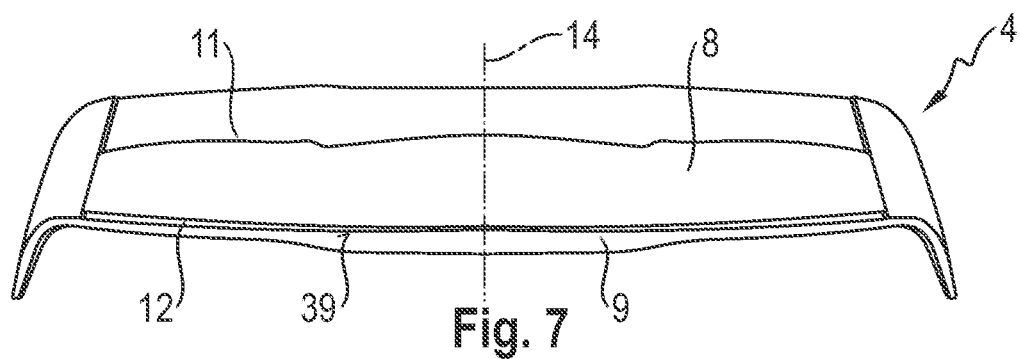
FIG. 7 shows a perspective view from the rear of the air-directing device according to FIG. 6.
Figure 8:
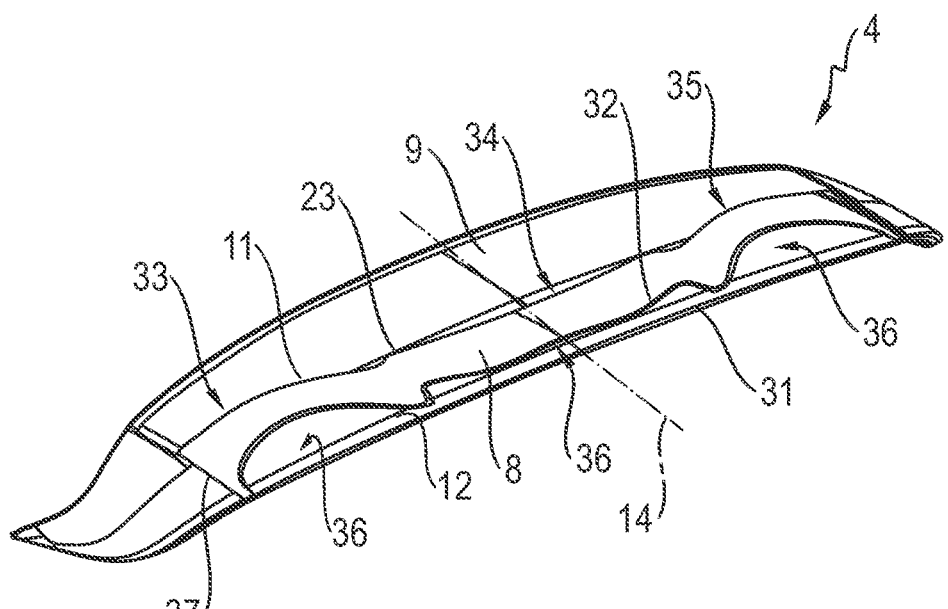
FIG. 8 shows a perspective view an air-directing device according to a fifth embodiment of the invention.
Figure 9:
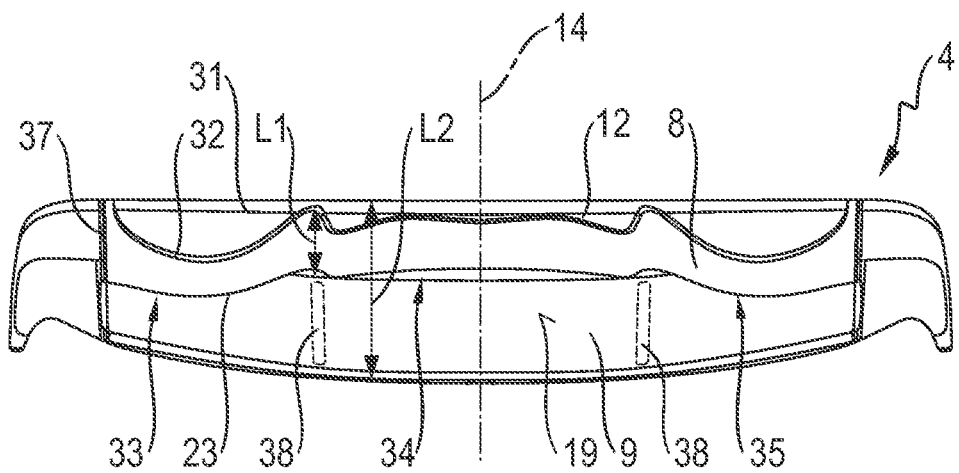
FIG. 9 shows a plan view of the air-directing device according to FIG. 8.
Figure 10:
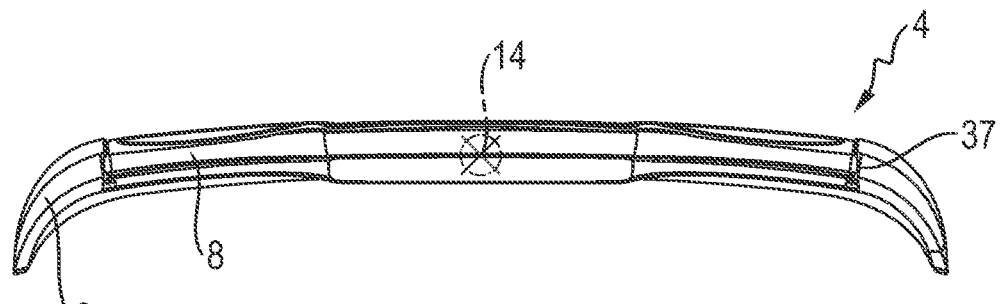
FIG. 10 shows a rear view of the air-directing device according to FIG. 8.

In a fourth exemplary embodiment according to FIGS. 6 and 7, and in a fifth exemplary embodiment according to FIGS. 8 to 11, the air-directing element 8 is designed in the form of a shaped element. This means, in other words, that the air-directing element 8, in particular the entry edge 23 and/or the second separation edge 32, is not an essentially rectilinear edge. Therefore, for example the air-directing element 8 of the air-guide device 4 of the fourth exemplary embodiment has the entry edge 23 with a first arcuate contour 33, a second arcuate contour 34 and a third arcuate contour 35, wherein the entry edge 34 is designed symmetrically in relation to the longitudinal axis 14. The first contour 33 and the second contour 35 are designed in an axially symmetrical manner or mirror-symmetrical manner in relation to the longitudinal axis 14, whereas the second contour 34 differs from the other two contours 33, 35. It would likewise be possible for all the contours 33, 34, 35 to differ from one another, i.e. for them also to be designed in a manner in which they are not axially symmetrical.

The air-directing element 8 is fixedly connected to the guide element 9 with the aid of its outer edges 37, which extend in the longitudinal direction and between the entry edge 23 and the second separation edge 32, such that the flow channel 10 is in the form of a channel which is delimited on either side and extends along the longitudinal axis 14, this resulting in the formation of a channel chamber 36 through which flow can take place in the direction of the longitudinal axis 14.

The flow channel 10 of the fourth exemplary embodiment is subdivided into three channel chambers 36 in the transverse direction, i.e. over its extent along the first width B1 of the air-directing element 8. This means, in other words, that the flow channel 10 has three channel chambers through which flow can take place in the direction of the longitudinal axis 14. It would likewise be possible for there to be just two chambers 36 or more than three chambers 36. The three channel portions 36 are formed with the aid of two supports 38, which extend in the direction of longitudinal axis 14.

The air-directing element 8 of the fifth exemplary embodiment likewise has three channel chambers 36, wherein both the entry edge 23 and the second separation edge 32 have a contour which differs significantly from a rectilinear contour, wherein they are of aerodynamically optimized design in order to create high-level downforce and a low drag coefficient of the motor vehicle 1.

Figure 11:
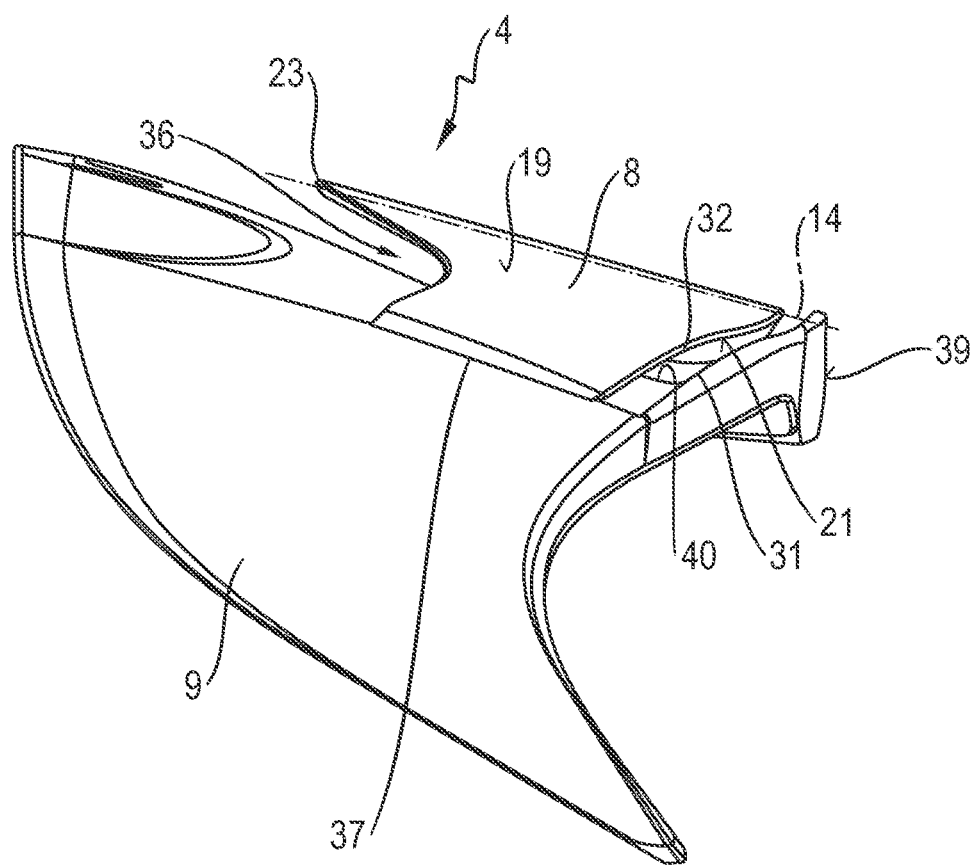
FIG. 11 shows a side view of the air-directing device according to FIG. 8.

The air-directing device 4 according to the fifth exemplary embodiment is illustrated in a side view in FIG. 11, wherein the longitudinal extent of the flow channel 10 can be seen to very good effect in this illustration. This illustration particularly shows that, starting from a typical roof spoiler beneath which flow cannot take place, and of which the upper spoiler surface, which faces toward the surroundings, is usually in alignment with the roofline 16, the air-directing device 4 according to the invention can be realized in a cost-effective manner by the formation of a flow bed 40 of the flow channel 10 with the aid of material removal or material reduction.

The distance between the entry edge 23 and the ramp edge 17 is preferably at least double the size of the distance between the air-directing element 8 and the guide element 9. This means that for example the distance between the entry edge 23 and the ramp edge 17 should be selected to be a value of 50 mm, wherein the distance between the air-directing element 8 and the guide element 9 should be selected to be a value ranging from 10 to 20 mm. In adaptation to the distance-value examples, the projecting portion 29 has a preferred value ranging between 2 and 5 mm.

As illustrated, in particular, in FIG. 2, during operation of the motor vehicle 1 in the direction of travel FR, the air flows, with the aid of the air-directing device 4 according to the invention, with barely any disturbance over the roof 18 and is drawn downward into the flow channel 10 with the aid of the flow ramp 15, and is therefore divided up into two sub-streams, wherein the one sub-stream flows over the upper surface 19 and the other sub-stream flows through the flow channel 10. This gives rise, in dependence on the speed of the motor vehicle 1, to the upper surface 19 being subjected to a certain compressive force by the sub-stream flowing over it, and the downforce being the result of said compressive force.

A resultant force in the flow channel 10, which is generated on account of the air flowing out of the exit opening 12 more or less perpendicularly to the upper surface 19, further increases the downforce since this sub-stream, with a corresponding force component, corresponds to an effect of a conventionally movable spoiler, beneath which flow cannot take place, when the spoiler is in position.

The air-directing element 8 and/or the guide element 9 can be produced from plastic, carbon fiber or the like. It is also possible for them to have the same or different coloring and/or surface configuration.

The air-directing device 4 according to the invention is not restricted to use for one particular type of vehicle body. It is thus possible for it to be used, as illustrated in FIG. 1, on a so-called SUV body and also, for example, on a so-called coupe body as well as, for example, on a so-called station-wagon body.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Motor vehicle
2 Motor-vehicle body
3 Rear-end region
4 Air-directing device
5 Rear axle
6 Rear edge of the roof
7 Rear window
8 Air-directing element
9 Guide element
10 Flow channel
11 Entry opening
12 Exit opening
13 Front of the vehicle
14 Longitudinal axis
15 Flow ramp
16 Roofline
17 Ramp edge
18 Roof
19 Upper surface
20 Floor of the vehicle
21 Lower surface
22 Flow arrow
23 Entry edge
24 Deflecting edge
25 Outer contour
26 Side surface
27 Channel-outflow portion
28 Channel-inflow portion
29 Projecting portion
30 Outer surface
31 First separation edge
32 Second separation edge
33 First contour
34 Second contour
35 Third contour
36 Channel chamber
37 Outer edge
38 Support
39 Separation surface
40 Flow bed
41 Longitudinal axis of the vehicle
B1 First width
B2 Second width
FR Direction of travel
L1 First length
L2 Second length

The invention claimed is:

1. An air-directing device for a motor-vehicle body, wherein the air-directing device is configured to be provided in a rear-end region of the motor-vehicle body, the air-directing device comprising:
  an air-directing element having a longitudinal axis and being accommodated in a guide element of the air-directing device,
  a flow channel being formed in between the guide element and the air-directing element, wherein flow can take place through the flow channel starting from an entry opening, which faces toward a front of the motor-vehicle body, and extending through an exit opening, which faces away from the entry opening, wherein the air-directing device is configured so that the air flowing through the flow channel is guided thereby such that it can flow out of the exit opening transversely to an outer contour of the air-directing element, and wherein the air directing element, at a rear side surface thereof, ends in front of or projects below a first separation edge of the guide element at the exit opening.

2. The air-directing device as claimed in claim 1, wherein an upper surface of the air-directing element is positioned at least in alignment with a virtual extension of a roofline, and/or beneath the virtual extension of the roofline, of the motor-vehicle body.

3. The air-directing device as claimed in claim 1, wherein the first separation edge of the guide element has, along its virtual extension, a projecting portion in relation to a second separation edge of the air-directing element.

4. The air-directing device as claimed in claim 1, wherein, starting from the entry opening, the flow channel tapers at least to some extent in the direction of the exit opening.

5. The air-directing device as claimed in claim 4, wherein, starting from the entry opening, the flow channel tapers continuously in the direction of the exit opening at least as far as a deflecting edge.

6. The air-directing device as claimed in claim 1, wherein the air-directing element is designed in the form of a shaped element.

7. The air-directing device as claimed in claim 1, wherein the air-directing element is designed symmetrically in relation to its longitudinal axis.

8. The air-directing device as claimed in claim 1, wherein the air-directing device has at least one channel chamber, wherein flow can take place through the channel chamber in the direction of a longitudinal axis of the air-directing element.

9. The air-directing device as claimed in claim 1, wherein the air-directing element is connected to the guide element with the aid of at least one support.

10. The air-directing device as claimed in claim 1, wherein the air-directing element is connected to the guide element along its outer edges extending in the direction of its longitudinal axis.

11. The air-directing device as claimed in claim 1, wherein the air-directing device is configured so that the air flowing through the flow channel is guided thereby such that it can flow out of the exit opening perpendicularly to an outer contour of the air-directing element.

12. A motor-vehicle body, comprising:
an air-directing device configured to influence a downforce and a drag coefficient, wherein the air-directing device is configured to be provided in a rear-end region of the motor-vehicle body, the air-directing device comprising:
an air-directing element having a longitudinal axis and being accommodated in a guide element of the air-directing device, a flow channel being formed between the guide element and the air-directing element, wherein flow can take place through the flow channel starting from an entry opening, which faces toward a front of the motor-vehicle body, and extending through an exit opening, which faces away from the entry opening, wherein the air-directing device is configured so that the air flowing through the flow channel is guided thereby such that it can flow out of the exit opening transversely to an outer contour of the air-directing element, and wherein the air directing element, at a rear side surface thereof, ends in front of or projects below a first separation edge of the guide element at the exit opening.

13. The air-directing device as claimed in claim 1, wherein at least a portion of the exit opening is open in a direction perpendicular to the outer contour of the air-directing element.

14. The air-directing device as claimed in claim 1,
wherein an upper surface of the air-directing element is essentially planar between an entry edge of the air-directing element and a second separating edge of the air directing element,
wherein a lower surface of the air-directing element faces away from the upper surface, and is essentially planer between an entry edge and a deflecting edge,
wherein the deflecting edge is rounded and connects the lower surface to the rear side surface, and
wherein the entry edge is rounded and connects the lower surface to the upper surface.

15. The air-directing device as claimed in claim 14, wherein the rear side surface faces away from the entry edge and faces toward a channel-outflow portion of the flow channel.

16. The air-directing device as claimed in claim 14,
wherein a flow bed of the flow channel comprises an outer contour of the guide element,
wherein the flow bed comprises a ramp edge at the roofline, the flow bed extending down from the roofline at the ramp edge, and
wherein the flow bed comprises a rear bend, the flow bed extending upward from the rear bend toward the first separation edge.

17. The air-directing device as claimed in claim 16, wherein a distance between the entry edge and the ramp edge is at least double a distance between the air directing element and the guide element at a channel-outflow portion of the flow channel.

18. The air-directing device as claimed in claim 14, wherein the entry edge with at least a first contour, a second contour, and third contour, at least one of the first contour, the second contour, or the third contour having a shape different from at least one other of the first contour, the second contour, or the third contour.

* * * * *